United States Patent [19]
Foley

[11] 3,971,900
[45] July 27, 1976

[54] COMMUNICATIONS HEADSET WITH ROTATABLE AND TILTABLE ELECTRICAL CONNECTOR

[75] Inventor: James P. Foley, Astoria, N.Y.

[73] Assignee: Roanwell Corporation, New York, N.Y.

[22] Filed: June 26, 1975

[21] Appl. No.: 590,592

Related U.S. Application Data

[63] Continuation-in-part of Ser. No. 555,529, March 5, 1975.

[52] U.S. Cl. .............................. 179/156 A; 339/7
[51] Int. Cl.² .................. H04M 1/05; H01R 39/08
[58] Field of Search ............................. 179/156 A

[56] References Cited
UNITED STATES PATENTS
2,081,622  5/1937  Foster .......................... 179/189 R
3,796,841  2/1974  Gorman ......................... 179/156 A Primary Examiner—William C. Cooper
Attorney, Agent, or Firm—Cooper, Dunham, Clark, Griffin & Moran

[57] ABSTRACT

This headset includes a single earphone and a boom mounted microphone. The headset is mounted on a yoke adapted to fit over a wearer's head with the transducers on either side of the wearer's head. The earphone transducer is in a housing spaced from the wearer's ear and coupled thereto through a flexible tube and an earpiece. A reversible microphone is mounted at the end of a curved conduit whose opposite end is supported on the housing by an electrical connector including an articulated plug assembly which permits rotation and tilting of the conduit with respect to the housing while maintaining electrical connections between the microphone and circuit elements within the housing. The conduit is curved to bring one side or the other of the microphone adjacent to the wearer's mouth when the headset is in place, and the curved conduit is properly positioned by appropriate rotation and tilting of the articulated assembly. The rotation and tilting accommodates shifting of the headset from one side to the other of the wearer's head, while maintaining the microphone in position adjacent one corner of the wearer's mouth.

7 Claims, 14 Drawing Figures

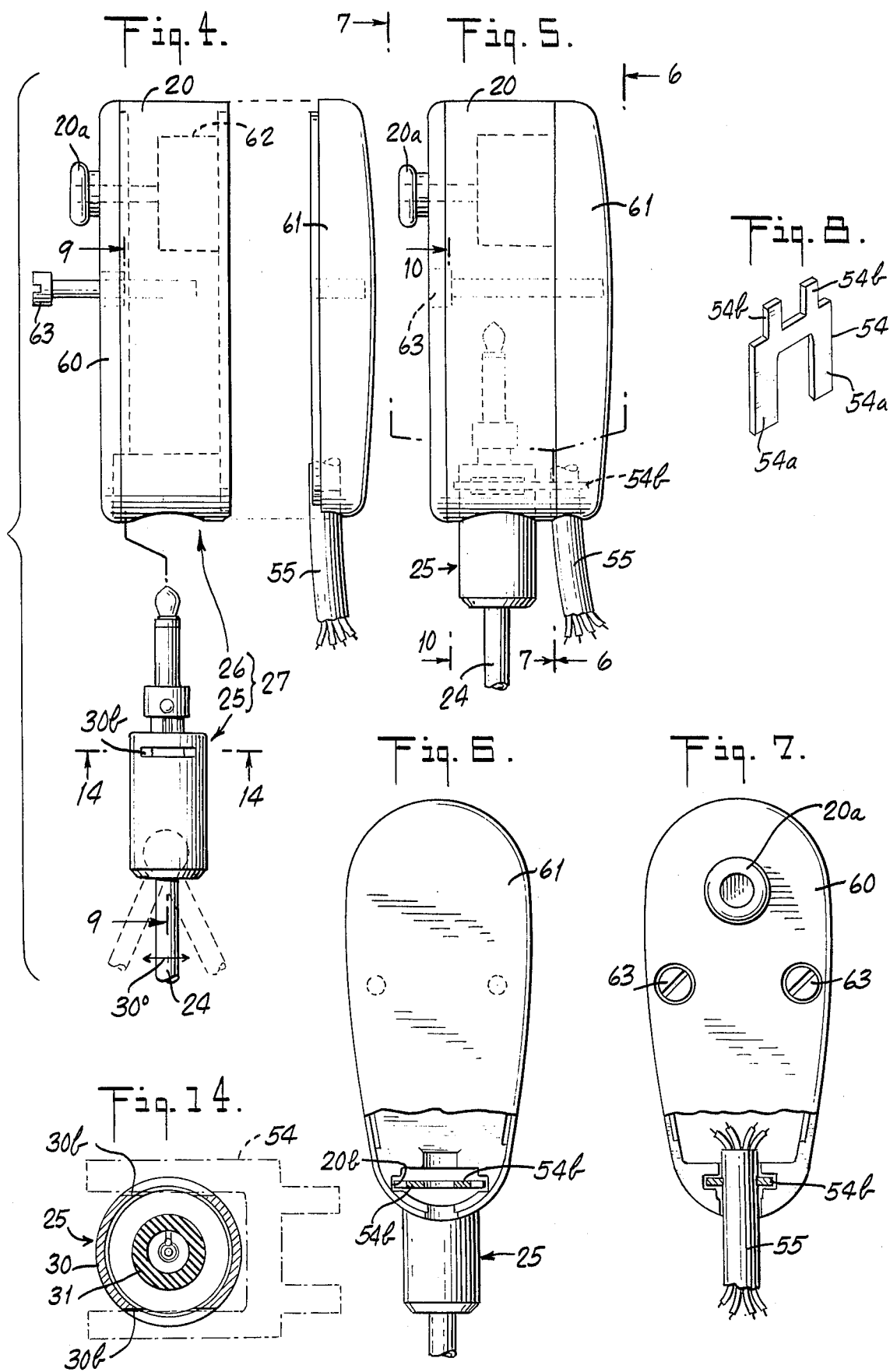

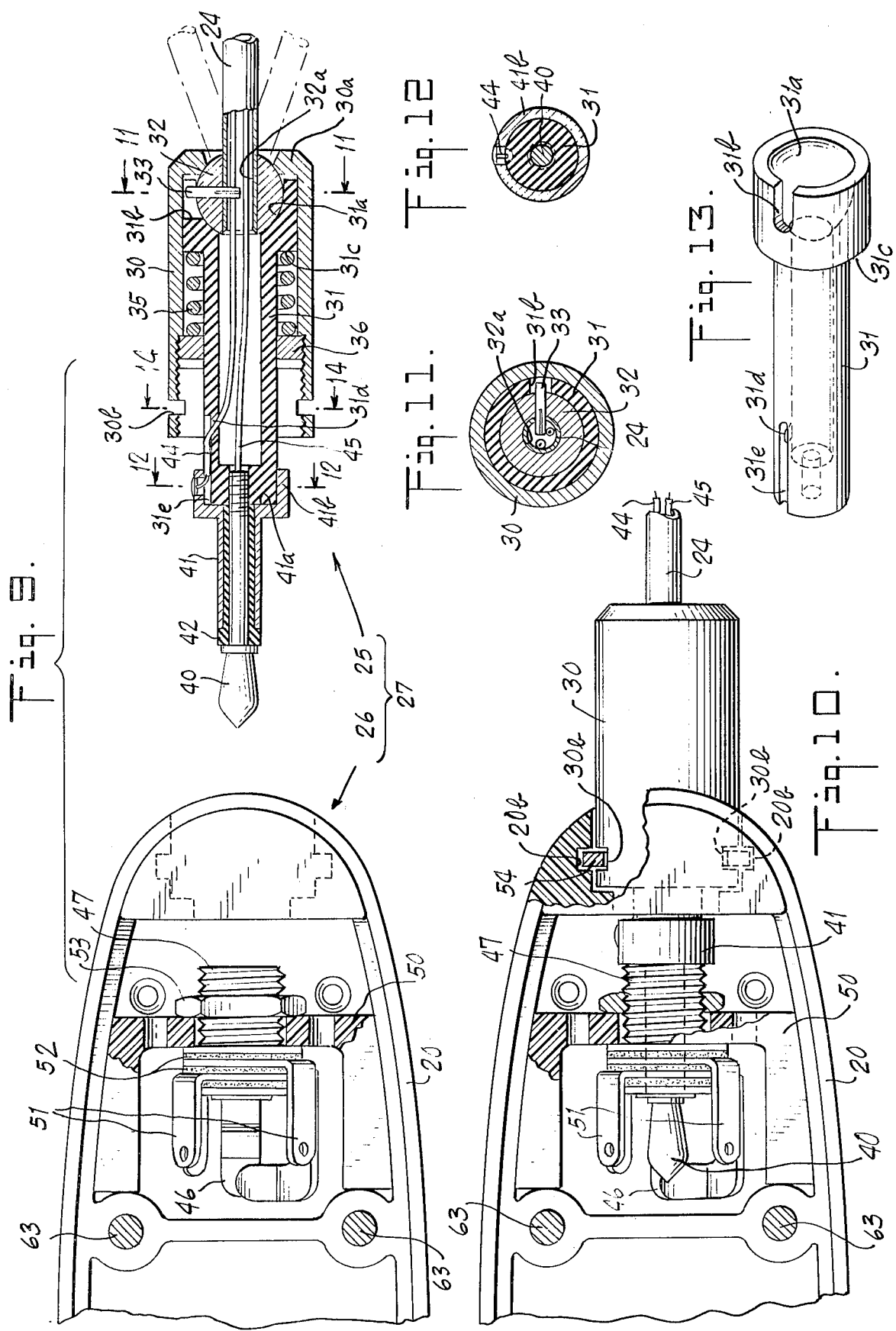

COMMUNICATIONS HEADSET WITH ROTATABLE AND TILTABLE ELECTRICAL CONNECTOR

CROSS-REFERENCES

This application is a continuation-in-part of my copending application Ser. No. 555,529, filed Mar. 5, 1975.

The reversible microphone employed in this invention may be that described in the copending application of Lech Poradowski, Ser. No. 592,632, filed July 2, 1975.

BRIEF SUMMARY OF THE INVENTION

The headset disclosed is supported by a yoke adapted to fit over the top of the wearer's head. Pad means at each end of the yoke engage the sides of the wearer's a head at areas spaced above the ears. One of the pad means has an aperture extending horizontally through it from front to back. A boom is insertable in either end of this aperture, and when so inserted is frictionally adjustable to project from the aperture by varying amounts. The outer projecting end of the boom supports a transducer housing, which in turn supports a microphone. An ear tube has one end coupled to the earphone transducer in the housing and has its opposite end fitted with an earpiece for insertion into the wearer's ear. The transducer housing is provided adjacent its lower end with an electrical connector including an articulated plug assembly.

A microphone is supported at the end of a conduit, and the opposite end of the conduit is supported by the articulated assembly, which permits both rotation and tilting of the conduit with respect to the housing, and retains the conduit and the microphone stably in any positions to which they are moved by that rotation and/or tilting. Wires from the microphone extend through the conduit to the plug assembly. The microphone circuit extends through the connector to electrical circuit elements within the housing.

The headset may be mounted on the wearer's head with the boom and the transducer housing either on the right or left side of the head. The boom should be inserted in the pad means so that it projects forwardly therefrom, and adjusted so that the earpiece is adjacent the wearer's ear for ready insertion therein. The microphone may then be positioned adjacent the wearer's mouth by means of the articulated plug assembly.

The connector includes a receptacle unit in the transducer housing, and a plug unit mating with the receptacle unit, and means for locking the plug and receptacle units together. The plug unit comprises an enclosing cylinder, and an articulated plug assembly rotatable in the cylinder. The plug assembly has a socket at its end remote from the housing and a ball received in the socket. The conduit is fixed to the ball. Except for a small amount of lost motion provided to accommodate tilting of the ball in the socket, the ball rotates with the plug assembly. The locking means fixes one end of the cylinder to the transducer housing.

A spring within the cylinder biases the plug assembly toward a seat at the end of the cylinder remote from the housing, thereby frictionally loading the ball. This frictional loading of the ball is effective to retain it and the conduit releasably in any rotated and tilted position to which the conduit may be adjusted.

The plug assembly has two contacts rotatably engaging two stationary contacts of the receptacle unit in the housing. The conduit may be rotated at will and the plug assembly will rotate with it, maintaining the microphone electrically connected to the contacts within the housing throughout that rotation. Thus, the microphone may be adjusted, by rotation or tilting of the supporting conduit, over a wide range of positions, without disturbing the electrical connections to the microphone.

THE DRAWINGS

FIG. 4 is an exploded elevational view of a housing and connector shown in FIG. 1.

FIG. 5 is a view similar to FIG. 4, but with the parts together which are shown separated in FIG. 4.

FIG. 6 is a view taken on the line 6—6 of FIG. 5

FIG. 7 is a view taken on the line 7—7 of FIG. 5.

FIG. 8 is an enlarged perspective view of a locking clip appearing in FIGS. 5-7, 10 and 14.

FIG. 9 is an exploded, fragmentary, sectional view taken on the line 9—9 of FIG. 4, on a larger scale.

FIG. 10 is a view similar to FIG. 9, but with the parts together which are shown separated in FIG. 9.

FIG. 11 is a cross-sectional view taken on the line 11—11 of FIG. 9.

FIG. 12 is a cross-sectional view taken on the line 12—12 of FIG. 9.

FIG. 13 is a perspective view of a sleeve member appearing in section in FIGS. 9, 11 and 12.

FIG. 14 is a sectional view on the line 14—14 of FIG. 9, with the clip of FIG. 8 shown in phantom.

DETAILED DESCRIPTION

FIGS. 1-3

Figure 1:
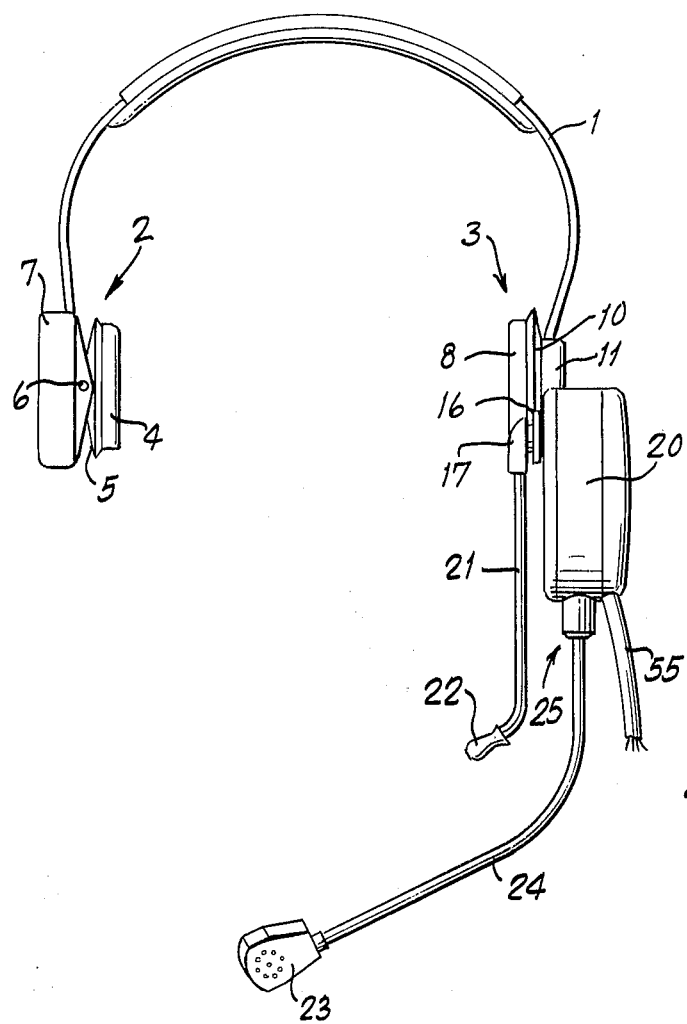
FIG. 1 is a front elevational view of a headset embodying the invention.
Figure 2:
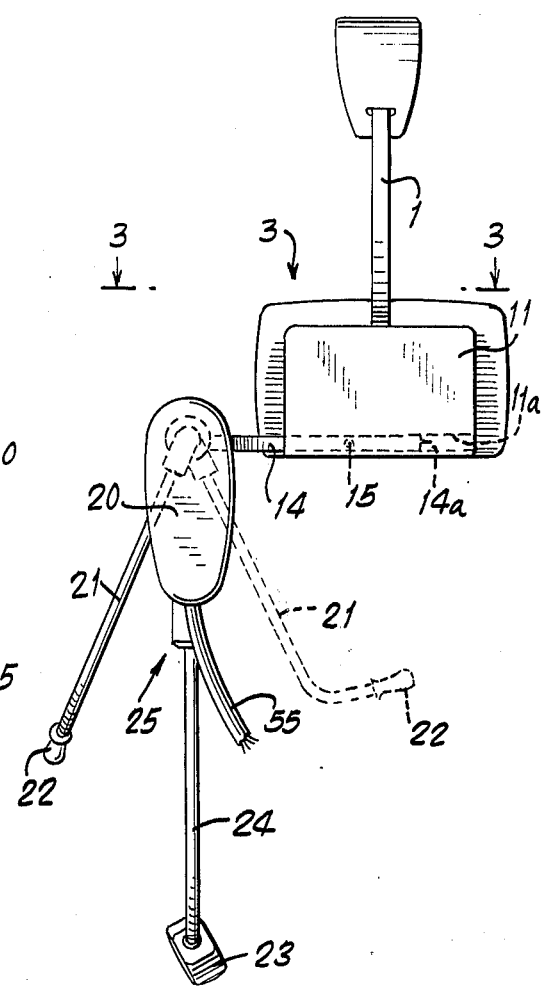
FIG. 2 is a right side elevational view of the headset of FIG. 1.

A headset according to the invention includes a yoke 1, best seen in FIGS. 1 and 2, adapted to fit over a wearer's head and two pad means 2 and 3 at opposite ends of the yoke. The pad means 2 comprises a resilient pad 4 of sponge rubber or the like fixed to a plate 5 which is pivoted at 6 to a casing 7 attached by any suitable means to an end of the yoke 1.

The pad means 3 comprises a resilient pad 8 (FIGS. 1 and 3) of sponge rubber or the like fixed to a plate 10. The plate 10 is attached to a casing 11 which is connected by any suitable means to the other end of the yoke 1.

The casing 11 is provided with an aperture 11a (FIGS. 2 and 3) extending from front to rear of the casing.

A boom 14 has one end 14a slidable into the aperture 11a from either end thereof. The boom 14 carries a projection 15 on its outer surface. When the boom 14 is in place in the casing 11, it is frictionally held by a leaf spring (shown in my copending application Ser. No. 555,529). The projection 15 prevents movement of the boom out of the aperture beyond its range of operating positions.

The outer end of the boom 14 has an offset 14b (FIG. 3) and beyond the offset the boom carries a double acoustic coupling element 16 (shown in detail in my copending application). The double coupling element 16 engages a cooperating ear tube coupler 17, and also engages a cooperating coupling element 60a (FIG. 4) on one cover 60 of a transducer housing 20.

The ear tube coupler 17 is connected to an ear tube 21 having at its end an earpiece 22 (see FIG. 3) adapted to be inserted into the ear canal of the wearer.

A microphone 23 (FIG. 1), which may be of the reversible type shown in the copending application of Lech Poradowski, Ser. No. 592,632, filed July 2, 1975, or any other suitable microphone, is fixed on the end of a conduit 24. The other end of the conduit 24 is attached to an articulated plug assembly 25.

FIGS. 4–13

The plug assembly 25 together with a receptacle 26 in the housing 20 form an electrical connector 27. A cylinder 30 encloses the right-hand end of the plug assembly 25, as viewed in FIG. 9. The plug assembly 25 includes a sleeve 31, open at both ends and having a spherical socket 31a formed in its right-hand end. The socket 31a receives a ball 32. The ball 32 has a diametrical aperture 32a in which the conduit 24 is fastened, as by bonding. A pin 33 (FIG. 11) projects from one side of the ball 32 and extends loosely into a slot 31b formed in the sleeve 31. The pin 33 and slot 31b are provided to allow movement of the ball in the socket as required to accommodate tilting, while nevertheless limiting the rotation of the ball with respect to the socket. In other words, the pin 33 and slot 31b provide a lost motion connection. Except for that lost motion, the sleeve 31 and all the parts fixed thereto rotate with the conduit 24 inside the cylinder 30, which is locked against rotation, as described below.

The right-hand end of the cylinder 30 has an inturned flange 30a which is contoured to provide a seat for the ball 32. The sleeve 31 has an external shoulder 31c. A coil spring 35 is held in compression between the shoulder 31c and the right-hand end of an annular nut 36, whose periphery is threaded to engage cooperating threads on the inside of the left end of cylinder 30, as viewed in FIG. 9. The spring 35 holds the ball 32 in frictional engagement with the seat on the flange 30a, so that the conduit 24 is releasably held in any position to which it may be rotated and/or tilted.

The left end of the sleeve 31 supports coaxial contact members 40 and 41, of a conventional telephone type, separated by an insulating sleeve 42. The outer contact member 41 has a shoulder 41a which abuts against the end surface of the sleeve 31, and a flange 41b which encircles the end of that sleeve. A wire 44 is attached to flange 41b, as by solder, and extends therefrom along a groove 31e in sleeve 31, and through an aperture 31d into the interior of the sleeve, and thence through the conduit 24 to a terminal of the microphone 23.

The axial contact member 40 extends through the sleeve 42 and is threaded into the end of sleeve 31. Its right-hand end is attached to another wire 45 which extends through the conduit 24 to the other terminal of microphone 23.

When the plug assembly 25 is inserted in the receptacle 26, the contact member 40 engages a spring contact 46, and the shoulder 41a on contact member 41 abuts against the right-hand end of a fitting 47 which extends through an opening at the center of an insulating yoke 50. The fitting 47 carries a stack of terminal members 51 and insulating discs 52 on the inner side of the yoke 50. The fitting 47 is clamped to the yoke 50 by means of a nut 53 engaging the threaded outer surface of the fitting 47. The terminals 51 may be connected by suitable wires (not shown) to other circuit elements, which may be located within the casing 20 or outside it, as required. After the plug assembly 25 is in place with the contacts 40 and 41 engaging the stationary contacts 46 and 47 in the casing 20, the plug assembly is locked therein by means of a retainer 54 (see FIGS. 8, 10 and 14). The retainer 54 has two arms 54a which engage slots 30b (FIGS. 4, 9 and 10) formed in the opposite sides of the casing 30, and cooperating slots 20b formed in the casing 20 (see FIG. 10). The retainer 54 thereby prevents axial movement of the plug assembly 25 with respect to the housing 20. The retainer 54 also has a pair of fingers 54b which yieldably engage (see FIG. 7) the opposite sides of a cable 55, which encloses wires carrying external circuit connections into the housing 20. Thus, the retainer 54 locks both the plug assembly 25 and the cable 55 against movement with respect to the casing 20.

The housing 20 includes an inside cover 60 on the side of the body nearest the wearer's head, and an outside cover 61 on the opposite side of the body. An acoustic coupling element 20a has an internal passage communicating through another passage in the housing 20 to an earphone transducer 62.

The cover 60 is first fastened to the housing 20 by suitable means, e.g., ultrasonic welding. The plug assembly 25 is then inserted in the receptacle 26.

The retainer 54 is then inserted through an opening provided in the right-hand side of the housing 20. The cable 55 is then attached and introduced between the fingers 54b of retainer 54. Thereafter, cover 61 is placed on the housing 20 and fastened by screws 63, which extend all the way through cover 60 and housing 20 into threaded inserts in cover 61.

It should be noted that in the plug assembly 25, the tilting movements of conduit 24 are accommodated by the ball 32 moving on the seat 30a, while rotating movements of that conduit are accommodated by rotation of sleeve 31, and contacts 40 and 41. The rotation function is therefore separated from the tilting function. The parts of the plug assembly 25 inside the cylinder 30 are capable of unlimited rotation with respect to the housing 20 without causing any twisting of the wires 44 and 45 in the conduit 24.

Figure 3:
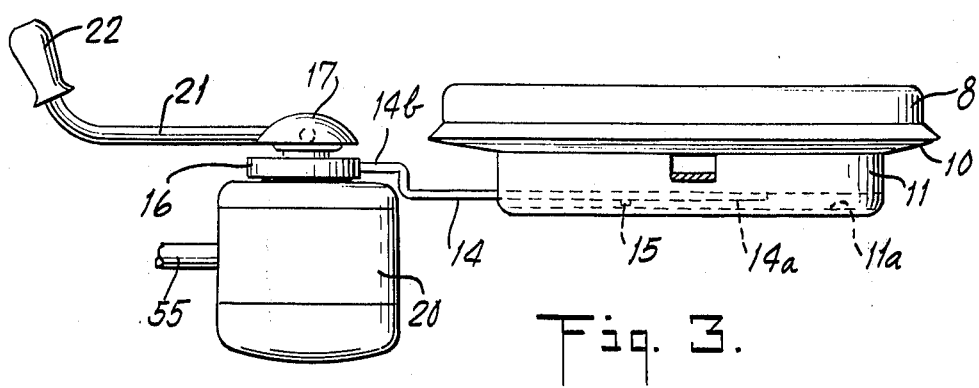
FIG. 3 is a cross-sectional view taken on the line 3—3 of FIG. 2, on an enlarged scale.

When the headset is in use on the left-hand side of the wearer's head, the boom 14 is assembled on the casing 11 in the manner shown in FIGS. 1–3, so that the transducer housing 20 is located forwardly of the wearer's ear. The flexible ear tube 21 may be formed as required to bring the earpiece 22 into alignment with the wearer's ear. See the dotted line position in FIG. 2. The microphone 23 may be adjusted by sliding the boom 14 in or out of the casing 11 and by rotating or tilting the conduit 24 on the articulated plug assembly 25, to bring the microphone close to the left corner of the wearer's mouth.

If it is desired to wear the headset with the earpiece 22 in the right ear of the wearer, then the boom 14 is inserted in the right-hand end of the casing 11, as viewed in FIG. 2. The boom must be turned over so that the offset 14b extends toward the wearer's face. The coupling between the transducer housing and the boom allows the transducer housing to be rotated so that it hangs down from the boom when the boom is on either side of the wearer's head. The conduit 24 may then be rotated and tilted on the articulated plug assembly 25 to bring the microphone 23 into position adjacent the right-hand corner of the wearer's mouth. Since the microphone may receive sound through either of its two major faces, it does not matter which of those two faces is nearest the wearer's mouth.

The connector 27 permits a wide range of adjustment of the microphone position, while using two insulated wires 44 and 45 within the conduit 24 to conduct the microphone current. Thus, the conduit 24, although it may be metallic, is not electrically charged. This presents a substantial advantage over other lightweight headsets with adjustable microphones supported on a "hot boom," so that the conduit serves as a conductor of the microphone current.

I claim:

1. A reversible headset comprising:
   a. headband means for supporting the headset on a wearer's head, said headband means including a yoke adapted to extend transversely over the wearer's head;
   b. boom means projecting forwardly from one end of the yoke;
   c. housing means supported on the projecting boom means;
   d. a reversible microphone;
   e. electrical connector means supported on said housing means;
   f. conduit having one end supporting the microphone and the other end supported by the connector means, said conduit being curved so that the microphone is disposed laterally of the housing means;
   g. conductor means connected at one end to the microphone and extending through the connector means into the housing means; and
   h. articulated means in the connector means supporting the conduit for continuous rotation thereof about one axis and tilting thereof about any axis transverse to said one axis to adjust the operating position of the microphone with respect to the wearer's mouth, while maintaining electrical connections between the microphone and the housing means.

2. A headset as in claim 1, in which:
   a. said articulated conduit supporting means includes:
      1. tiltable means supporting said other end of the conduit for tilting movement about any of said transverse axes;
      2. means continuously rotatable about said one axis and supporting the tiltable means; and
   b. said conductor means comprises:
      1. continuous wires extending through the conduit and the conduit supporting means;
      2. contact means on the continuously rotatable means and connected to said wires; and
      3. fixed contact means in the housing means cooperating with said first-mentioned contact means.

3. A headset as in claim 2, including locking means holding said continuously rotatable means against movement with respect to the housing means in the direction of said one axis.

4. A headset as in claim 1, in which the connector means includes:
   a. a receptacle in the housing including first and second contact members electrically insulated from the housing and from each other and fixed against rotation with respect to the housing;
   b. a plug including third and fourth contact members on one end, said third and fourth contact members being electrically insulated from each other, said plug being insertable into the receptacle and rotatable therein to place said third and fourth contact members into relatively rotatable engagement with the first and second contact members, respectively;
   c. a casing enclosing the other end of the plug;
   d. a socket fixed on the other end of the plug and within the casing, said socket having a central aperture therein, said plug and socket being rotatable in the casing;
   e. a ball tiltable in the socket with respect to the axis of said central aperture, said ball having a diametrical aperture in which an end of the conduit is fixed, said casing having in its end adjacent the ball an opening through which the conduit extends;
   f. means limiting the rotation of the ball with respect to the socket; and
   g. a pair of electrically insulated conductors extending through the conduit and the ball into the casing and into electrical contact with said third and fourth contact members.

5. A headset as in claim 4, including ball seat means in the casing, and spring means within the casing biasing the ball into engagement with the ball seat means, so as to frictionally load the plug and hold it in any rotated or tilted position.

6. Apparatus for electrically connecting contacts in a housing with conductors in a conduit rotatable and tiltable with respect to the housing, comprising:
   a. a receptacle in the housing including first and second contact members electrically insulated from the housing and from each other and fixed against rotation with respect to the housing;
   b. a plug including third and fourth contact members on one end, said third and fourth contact members being electrically insulated from each other, said plug being insertable into the receptacle and rotatable therein to place said third and fourth contact members into relatively rotatable engagement with the first and second contact members, respectively
   c. a casing enclosing the other end of the plug;
   d. a socket fixed on the other end of the plug and within the casing, said socket having a central aperture therein, said plug and socket being rotatable in the casing;
   e. a ball tiltable in the socket with respect to the axis of said central aperture, said ball having a diametrical aperture in which an end of the conduit is fixed, said casing having in its end adjacent the ball an opening through which the conduit extends;
   f. means limiting the rotation of the ball with respect to the socket; and
   g. a pair of electrically insulated conductors extending through the conduit and the ball into the casing and into electrical contact with said third and fourth contact members.

7. Electrical connector apparatus as in claim 6, including: ball seat means in the casing, and spring means within the casing biasing the ball into engagement with the ball seat means, so as to frictionally load the plug and hold it in any rotated or tilted position.

* * * * *

UNITED STATES PATENT OFFICE
CERTIFICATE OF CORRECTION

Patent No. 3,971,900         Dated July 27, 1976

Inventor(s) James P. Foley

It is certified that error appears in the above-identified patent and that said Letters Patent are hereby corrected as shown below:

Col. 5, line 28, after "f." insert -- a --.

Col. 6, line 64, "plug" should read -- ball --.

Signed and Sealed this

Nineteenth Day of October 1976

[SEAL]

Attest:

RUTH C. MASON
Attesting Officer

C. MARSHALL DANN
Commissioner of Patents and Trademarks